Sept. 15, 1936.    J. S. LOCKE    2,054,331
CONTROL SYSTEM
Filed June 28, 1934    2 Sheets-Sheet 1

Inventor

James S. Locke

By George H. Fisher
Attorney

Patented Sept. 15, 1936

2,054,331

UNITED STATES PATENT OFFICE 2,054,331

CONTROL SYSTEM

James S. Locke, Minneapolis, Minn., assignor to Minneapolis-Honeywell Regulator Company, Minneapolis, Minn., a corporation of Delaware Application June 28, 1934, Serial No. 732,837

16 Claims. (Cl. 236—74)

The present invention relates to an improved electric control system by means of which a plurality of circuit-closing controllers control the operation of a single device, the invention having particular utility in the field of automatic controls wherein the single device controls or changes the conditions to which each of the controllers responds.

An object of the invention is the provision of an automatic control system in which a condition changing device or means that changes the value of a condition at a plurality of points is controlled by the conjoint action of a plurality of circuit-closing controllers which respond to the values of the condition at the various points.

A further object of the invention is the provision of an electrical control system by which a plurality of double-circuit controllers conjointly control the operation of a pair of interconnected and oppositely acting electrical devices, so that the resulting action of the electrical devices depends upon the average condition of all of the controllers.

A further object of the invention is the provision of a temperature control system in which a temperature changing or controlling means for changing or controlling the temperature in a plurality of compartments is controlled by the average condition of a plurality of circuit making and breaking controllers, each of which is responsive to the temperature in only one of the compartments.

A further object of the invention is the provision of an electrical control system in which there is a plurality of circuit making and breaking controllers, each of which is adapted to energize one of a pair of oppositely acting electrical devices to a predetermined extent upon an increase in the value of the condition to which each controller responds, and to energize the other of the pair of oppositely acting electrical devices to a similar extent upon a decrease in the value of the condition to which each controller responds, whereby the effective energization of the two electrical devices corresponds to an average of the conditions or positions of the various controllers.

Other objects of the invention will be found in the description, the drawings, and the appended claims.

For a more complete understanding of the invention, reference may be had to the following detailed description and the accompanying drawings, in which.

Figure 1:
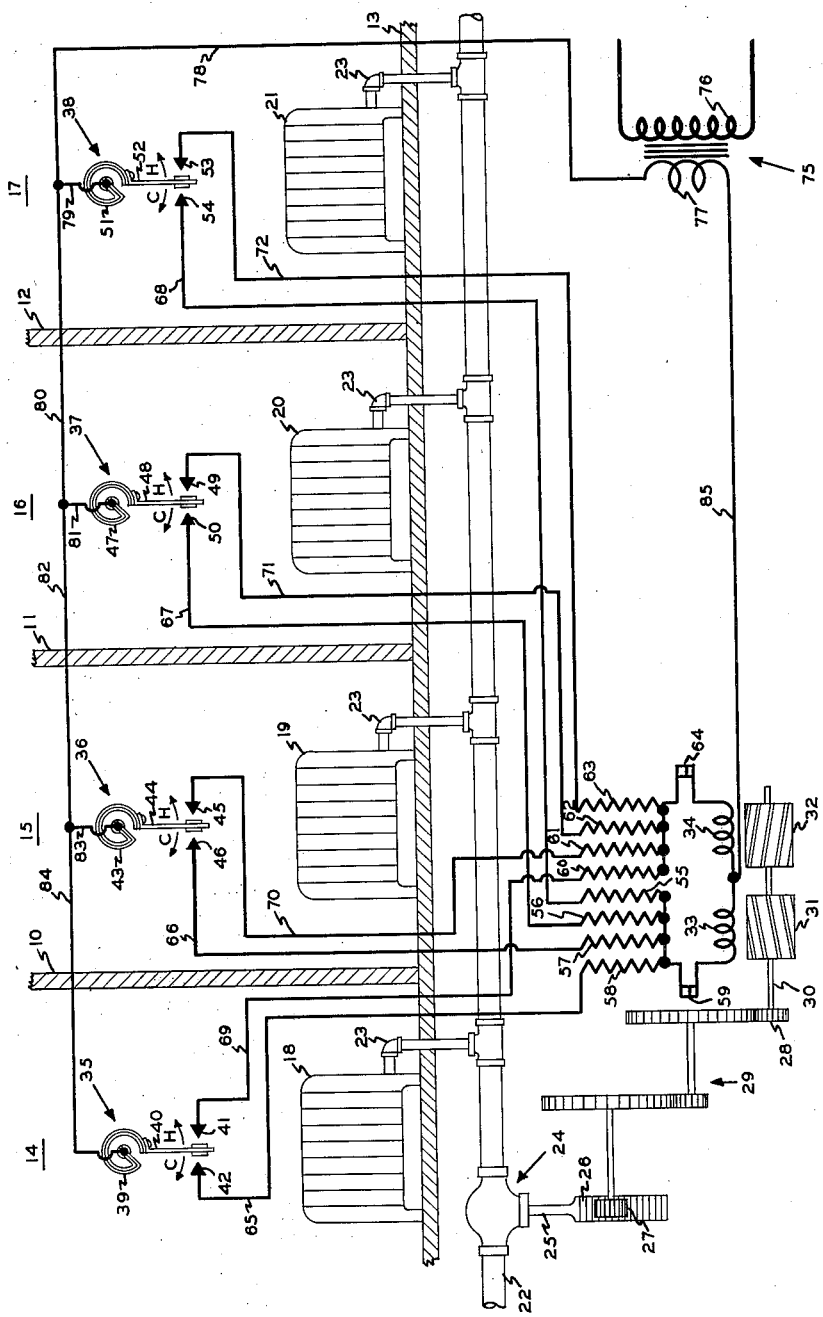
Fig. 1 is a diagrammatic showing of one form of the invention.

Referring first to Fig. 1 of the drawings, a portion of a building is shown as comprising walls 10, 11, and 12 and a floor 13 by means of which the building is divided into a plurality of compartments indicated at 14, 15, 16, and 17. The means for changing the value of some condition at a plurality of points is herein shown in the form of a temperature changing means which is specifically illustrated as a heating means. This heating means includes radiators 18, 19, 20, and 21 which are respectively located in the compartments 14 to 17, inclusive. Each radiator is connected to a heating fluid main 22 by means of a riser 23. The flow of fluid through the main 22 to each and all of the radiators 18 to 20, inclusive, is controlled by a single valve generally indicated at 24. Valve 24 includes valve stem 25 with which is associated a rack 26. Cooperating with the rack 26 is a pinion 27 that is connected to a motor pinion 28 through suitable gear-reducing mechanism indicated at 29. The motor pinion 28 is secured to a rotor shaft 30 which also carries a pair of motor rotors 31 and 32. Associated with the motor rotor 31 is a field winding 33 and, in a similar manner, a field winding 34 is associated with motor rotor 32.

It is to be understood that the heating system herein illustrated is merely exemplary of any of the well-known types of temperature changing mechanisms or, for that matter, of any type of condition changing means. The rotors 31 and 32 are arranged to exert opposing torques when their respective field windings 33 and 34 are energized so as to constitute a reversible motor. It will be readily appreciated that any other type of known reversible motor could be substituted for the mechanism illustrated.

Each of the compartments 14, 15, 16, and 17 is provided with a circuit making and breaking controller, these controllers being designated at 35 to 38, inclusive, all of them herein being illustrated as comprising double circuit temperature controllers of well-known construction.

The temperature controller 35 is shown as comprising a curved bimetallic element 39 which controls a contact arm 40. Upon a rise in the temperature to which the bimetallic element 39 responds, contact arm 40 is adapted to engage a contact 41, whereas upon a temperature fall, the contact arm 40 engages a contact 42, there being an intermediate temperature value at which the contact arm 40 is disengaged from both the hot and cold contacts 41 and 42. The temperature controller 36 similarly includes a curved bimetallic element 43 that operates a contact blade 44 which is adapted to engage hot and cold contacts 45 and 46. The temperature controller 37 includes a bimetallic element 47, contact arm 48, hot contact 49, and cold contact 50; and the temperature controller 38 includes bimetallic element 51, contact arm 52, hot contact 53, and cold contact 54.

Current varying means in the form of resistance means are associated with the field windings 33 and 34. In the particular embodiment of the invention herein illustrated, four resistances 55, 56, 57, and 58 are electrically connected to one end of field winding 33 through a limit switch 59. Similarly, four resistances 60, 61, 62, and 63 each have one of their ends connected to one end of field winding 34 through a limit switch 64. The other end of resistance 58 is connected to cold contact 42 of controller 35 by a wire 65. Similarly, the other ends of resistances 57, 56, and 55 are respectively connected to the cold contacts 46, 50, and 54 of the controllers 36, 37, and 38 by wires 66, 67, and 68. The other ends of resistances 60, 61, 62, and 63 are respectively connected to the hot contacts 41, 45, 49, and 53 of the controllers 35, 36, 37, and 38 by wires 69, 70, 71, and 72. Electrical power is shown as being supplied by a stepdown transformer 75 having a high voltage primary 76 connected to suitable line wires and a low voltage secondary 77. One end of secondary 77 is connected to the contact arms 52, 48, 44, and 40 of the various controllers by means of wires 78, 79, 80, 81, 82, 83, and 84. The other side of secondary 77 is connected to the remaining ends of field windings 33 and 34 by a wire 85.

*Operation of the system of Fig. 1*

With the parts in the position shown, the temperature in each of the compartments is intermediate so that the contact arm of each controller is intermediate its associated hot and cold contacts. Both field windings 33 and 34 are completely deenergized and no force is being exerted in either direction upon the rotor shaft 30. The valve 24 therefore remains in the particular position in which it is shown and which may be assumed to be half-open position. An intermediate amount of heating fluid is therefore being supplied to each of the radiators 18, 19, 20, and 21.

If for any reason the temperature of compartment 35 should rise causing the contact arm 40 of controller 35 to engage its hot contact 41, an energizing circuit for field winding 34 will be established as follows: secondary 77, wire 78, wire 80, wire 82, wire 84, bimetallic element 39, contact arm 40, hot contact 41, wire 69, resistance 60, limit switch 64, field winding 34, and wire 85 to the other side of secondary 77. The rotor 32 therefore exerts a small amount of torque on rotor shaft 30 tending to rotate the same in clockwise direction as viewed from the left, whereupon the rack 26 is moved upwardly to move the valve 24 towards closed position. In a similar manner, if any other of the controllers moves its contact arm into engagement with its hot contact, a further energizing circuit for the field winding 34 will be established to move the valve 24 toward closed position.

It will therefore be evident that the energization of field winding 34 will be proportional to the number of controllers engaging their respective hot contacts if the remaining controllers are in their neutral positions wherein both their hot and cold contacts are disengaged.

With the parts in the position shown, if the temperature of compartment 14 should decrease causing the contact arm 40 of its controller 35 to engage its cold contact 42, then an energizing circuit for field winding 33 will be established as follows: secondary 77, wire 78, wire 80, wire 82, wire 84, bimetallic element 39, contact arm 40, cold contact 42, wire 65, resistance 58, limit switch 59, field winding 33, and wire 85 to the other side of secondary 77. The rotor 31 therefore exerts a small amount of torque on the rotor shaft 30, tending to rotate the same in a counter-clockwise direction as viewed from the left, whereupon the rack 26 is moved downwardly to move the valve 24 toward open position. Similarly, if any other of the controllers moves its contact arm into engagement with its hot contact, a similar energizing circuit for field winding 33 will be established to move the valve 24 toward open position.

If the contact arm 40 of controller 35 should engage its cold contact 42 by reason of a drop in the temperature in compartment 14, and if contact arm 44 of controller 36 should engage its hot contact 45 by reason of a rise in the temperature of compartment 15, then field winding 33 will be energized as above described through resistance 58, and field winding 34 will be energized as follows: secondary 77, wire 78, wire 80, wire 82, wire 83, bimetallic element 43, contact arm 44, hot contact 45, wire 70, resistance 61, limit switch 64, field winding 34, and wire 85 to the other side of secondary 77. Equal and opposite torques will therefore be exerted on rotor shaft 30 by rotors 31 and 32, assuming that the remaining controllers are in their neutral positions. The valve 24 will therefore remain stationary or will stop moving depending upon whether it was formerly at rest or moving. Now, if the temperature in compartment 16 should rise, contact arm 48 of controller 37 will move into engagement with its hot contact 49 to establish a further energizing circuit for field winding 34 as follows: secondary 77, wire 78, wire 80, wire 81, bimetallic element 47, contact arm 48, hot contact 49, wire 71, resistance 62, limit switch 64, field winding 34, and wire 85 to the other side of secondary 77. Field winding 34 is now energized twice as highly as field winding 33, whereupon the torque of rotor 32 will overcome the torque of rotor 31, and the rotor shaft 30 will be rotated in clockwise direction as viewed from the left, whereupon valve 24 is moved toward closed position. If, on the other hand, the temperature in compartment 16 should fall, contact arm 48 of controller 37 will move into engagement with cold contact 50, whereupon field winding 33 will be additionally energized as follows: secondary 77, wire 78, wire 80, wire 81, bimetallic element 47, contact arm 48, cold contact 50, wire 67, resistance 56, limit switch 59, field winding 33, and wire 85 to the other side of secondary 77. The field winding 33 is therefore more highly energized than field winding 34. The torque of motor rotor 31 therefore overcomes the torque of motor rotor 32 so that rotor shaft 30 is rotated in a counter-clockwise direction as viewed from the left, and the valve 24 is moved toward open position. Now, if the temperature in compartment 17 should rise so as to move the contact arm 72 of its controller 38 into engagement with its hot contact 53 with the remaining controllers in their last mentioned positions, then another energizing circuit for field winding 34 will be established as follows: secondary 77, wire 78, wire 79, bimetallic element 51, contact arm 52, hot contact 53, wire 72, resistance 63, limit switch 64, field winding 34, and wire 85 to the other side of secondary 77. The energizations of field windings 33 and 34 are thus again equalized so that further rotation of rotor shaft 30 ceases.

From the foregoing, it will be apparent that the direction of rotation of rotor shaft 30 depends entirely upon whether more hot contacts of the controllers are engaged by their cooperating contact arms than cold contacts. In other words, the control of the valve 24 depends upon an averaging of the conditions of the various controllers. This does not necessarily mean that the valve 24 is controlled in accordance with the average temperature throughout the various compartments; it only means that the valve is controlled according to whether or not there are more controllers demanding movement in one direction than there are demanding movement in the other direction. In this particular embodiment of the invention, the power delivered to rotor shaft 30 will vary according to the differences in energizations of the field windings 33 and 34, and these differences will depend upon the relative number of circuits closed throughout each field winding.

By making the gear reduction 29 relatively small in comparison with the speed of the rotor shaft 30, the valve 24 will be moved to open or closed position in a relatively short time so that "on and off" control will be obtained, whereas if a relatively large gear reduction is utilized in respect to the speed of the rotor shaft 30, then the valve 24 will move slowly so as to obtain "floating control". In either event, the underlying characteristics of the invention will not be changed, in that the valve will be moved in a direction corresponding to the greatest demand evidenced by the conditions of all of the controllers.

The limit switches 59 and 64 are operated in any of the well-known manners to interrupt the circuits through field windings 33 and 34 respectively when the valve 24 has been respectively completely opened or completely closed, all as is well-known in the art of automatic control.

Figure 2:
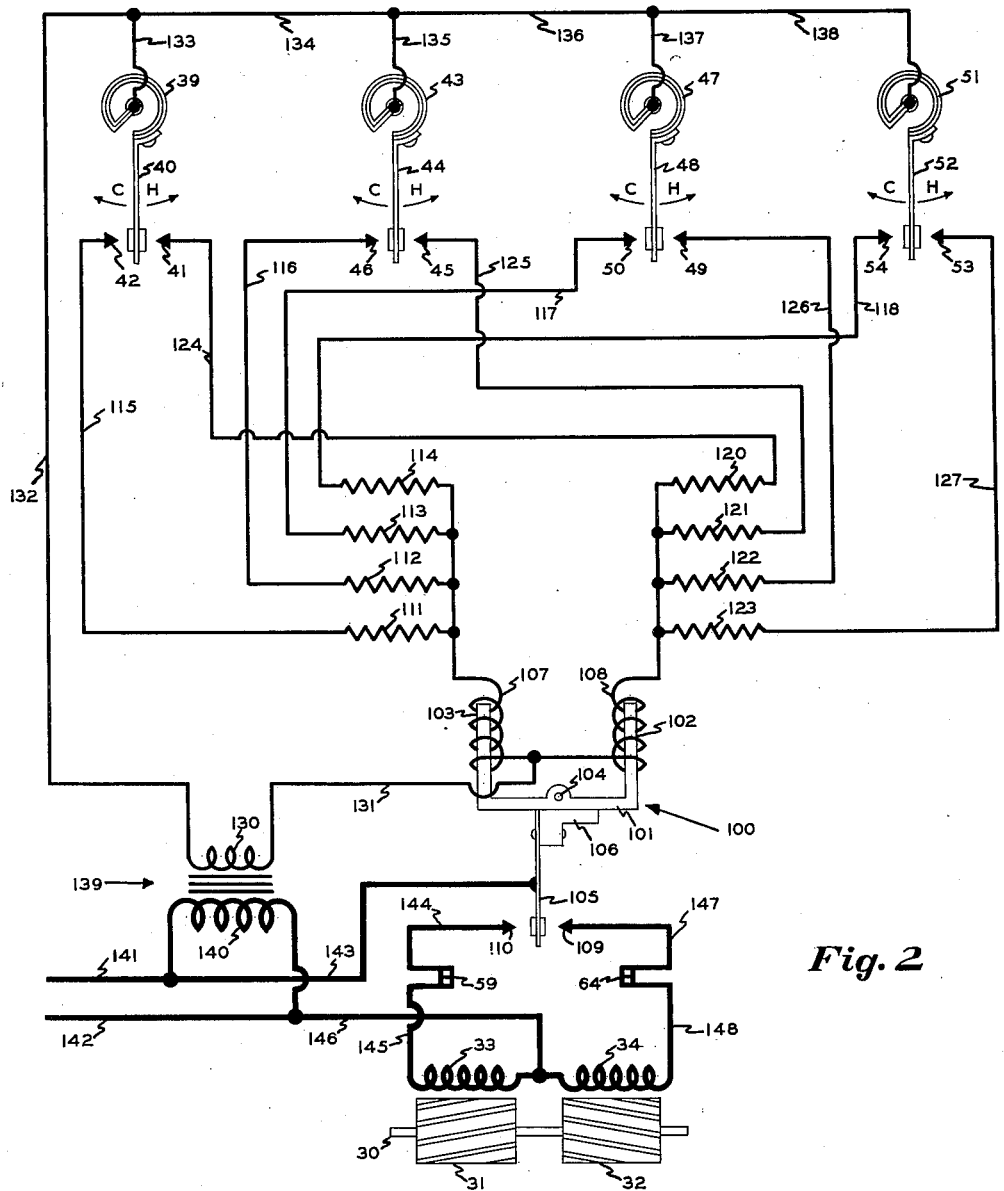
Fig. 2 is a diagrammatic showing of a modified circuit arrangement for carrying out the present invention.

Under certain conditions, it may be desired that the energizations of the two field windings should not be varied directly according to the number of controllers closing circuits through such field windings. This feature can be obviated by introducing a relay mechanism between the reversible rotor mechanism and the controllers. Fig. 2 of the drawings shows such an arrangement. The various controllers have been given the same reference numerals as the corresponding controllers in Fig. 1. These controllers, in the system of Fig. 2, control a balanced relay 100 which includes armature 101 having legs 102 and 103, the armature being pivoted at 104. The armature 101 carries a switch arm 105 through the medium of a block of insulating material 106. A pair of electrical devices, herein shown as electromagnetic coils 107 and 108, cooperate with the legs 103 and 102 of the armature 101 in order to position the switch arm 105. When both electromagnetic coils 107 and 108 are deenergized or are equally energized, then the parts assume the position wherein switch arm 105 is disengaged from both of a pair of contacts 109 and 110. If electromagnetic coil 107 is more highly energized than electromagnetic coil 108, then switch arm 105 moves into engagement with contact 110. Similarly, if electromagnetic coil 108 is energized more highly than electromagnetic coil 107, then switch arm 105 engages contact 109.

Four resistances 111, 112, 113, and 114 have one of their ends connected to one end of electromagnetic coil 107, while the other ends thereof are respectively connected to cold contacts 42, 46, 50, and 54 by means of wires 115, 116, 117, and 118. Similarly, four resistances 120, 121, 122, and 123 have one of their ends connected to one end of electromagnetic coil 108, while their other ends are respectively connected to hot contacts 41, 45, 49, and 53 by wires 124, 125, 126, and 127. The other ends of electromagnetic coils 107 and 108 are both connected to one side of a secondary 130 by a wire 131. The other side of this secondary 130 is connected to bimetallic elements 39, 43, 47, and 51 by means of wires 132, 133, 134, 135, 136, 137, and 138. The secondary 130 forms a part of a transformer 139 which includes a high voltage primary 140 connected to suitable line wires 141 and 142.

Upon engagement of switch arm 105 with contact 110, field winding 33 is energized as follows: line 141, wire 143, switch arm 105, contact 110, wire 144, limit switch 59, wire 145, field winding 33, and wire 146 to line 142. Similarly, whenever switch arm 105 engages contact 109, field winding 34 is energized as follows: line 141, wire 143, switch arm 105, contact 109, wire 147, limit switch 64, wire 148, field winding 34, and wire 146 to line 142.

From the foregoing description in connection with the system of Fig. 1, it will be evident that electromagnetic coils 107 and 108 will be equally energized whenever all of the controllers are in the intermediate position shown or whenever equal numbers of controllers have their contact arms engaging hot and cold contacts. This means that neither field winding 33 nor 34 will be energized under these conditions. On the other hand, whenever a larger number of the controllers have their contact arms engaging cold contacts than are engaging hot contacts, then electromagnetic coil 107 will be energized more highly than electromagnetic coil 108, whereupon field winding 33 will be energized to open the valve. Likewise, when a larger number of controllers have their contact arms engaging hot contacts than cold contacts, then electromagnetic coil 108 will be energized more highly than electromagnetic coil 107, and switch arm 105 will engage contact 109, whereupon field winding 34 will be energized to move the valve in valve closing direction.

In this manner, by the interposition of a relay mechanism between the controllers and the motor field windings, it is possible to eliminate the varying torques that are present in the system of Fig. 1, this variation of current-flow being applied to the relay mechanism rather than to the motors.

While the invention has been specifically shown as applied to a particular type of heating system, it will be evident that it is equally well applicable to other types of heating systems and also to temperature changing systems in general, as well as to any system of automatic control. Many changes can be made by those skilled in the art, and it should therefore be understood that I am to be limited only by the scope of the following claims.

I claim:

1. A control system of the class described, comprising, in combination, means for changing the value of a condition at a plurality of points, oppositely acting electrical means in control of said means, a plurality of switching devices of the double circuit type each controlled in response to changes in a condition and adapted to close a first circuit upon an increase in the value of the condition by which it is controlled and to close a second circuit upon a decrease in the value of such condition, resistance means associated with each one of the oppositely acting electrical means, and connections between the resistance means and switching devices by which each switching device upon closing one of its circuits completes a circuit for one part of the oppositely acting electrical means through a portion of one of said resistance means and upon closing the other of its circuits completes a circuit for the other part of the oppositely acting electrical means through a portion of the other of said resistance means.

2. A control system of the class described, comprising, in combination, means for changing the value of a condition at a plurality of spaced points, a pair of opposed electromagnetic coils in control of said means, a plurality of switching devices of the double circuit type each controlled by changes in the value of the condition at one of said points and adapted to close first and second circuits upon increase and decrease in the value of the condition by which it is controlled, separate resistance means associated with each of said electromagnetic coils, circuit connections between one of said resistance means, one of the electromagnetic coils and all of said switching devices by which the completion of one of its circuits by each one of the switching devices energizes said one of the electromagnetic coils through a different portion of one of the resistance means, and circuit connections between the other of the resistance means, the other of said electromagnetic coils and all of the switching devices by which the completion of the other of its circuits by each one of the switching devices energizes said other one of the electromagnetic coils through a different portion of the other of said resistance means.

3. A control system of the class described, comprising, in combination, means for changing the value of a condition at a plurality of spaced points, a pair of oppositely acting electrical devices in control thereof, a plurality of switches each controlled by variations in the value of the condition at one of said points, each controller including a first contact, a second contact, and a cooperating circuit closing member adapted to engage alternatively said contacts upon increase and decrease in the value of the condition by which it is controlled, a plurality of resistances equal in number to the total number of switch contacts, connections connecting one end of half of the resistances to one end of one of the electrical devices, connections connecting the remaining end of each of said resistances to the first contact of a different one of the switches, connections connecting one end of the other half of the resistances to one end of the other of said electrical devices, connections connecting the remaining end of each of said other half of the resistances to the second contact of a different one of the switches, connections for connecting the remaining ends of both electrical devices to one side of a source of power, and connections for connecting all of the circuit-closing members of all of the switches to the other side of the source of power.

4. A system of the class described, comprising, in combination, means for changing the value of a condition at a plurality of spaced points, a pair of oppositely acting electrical devices in control thereof, a plurality of condition controlled switches each including first and second contacts and a contact member adapted to engage alternately the contacts upon increase and decrease of the condition by which each switch is controlled, each switch being controlled by variations in the value of the condition at a different one of said spaced points, a plurality of resistances having one end of each connected to one of the first contacts of the switches and all their other ends connected to one end of one of said electrical devices, a plurality of resistances having one end of each connected to one of the second contacts of the switches and all their other ends connected to one end of the other of the electrical devices, connections for connecting all of said contact members to one side of a source of power, and connections for connecting the remaining end of each of the electrical devices to the other side of the source of power.

5. In combination, reversible motor means for changing the value of a condition at a plurality of spaced points, switching means in control thereof, a pair of oppositely acting electromagnetic windings in control of the switching means, a plurality of switching devices each controlled by the value of the condition at one of said points, each switching device being adapted to close a circuit to one of said electromagnetic coils upon an increase in the value of the condition to which it responds and to close a circuit to the other of the electromagnetic coils upon a decrease in such condition, and a fixed resistance in each switching device, whereby closure of any such circuit energizes its associated electromagnetic windings to a predetermined extent.

6. In a temperature controlling system, in combination, a temperature changer, a pair of opposed electrical devices in control thereof, resistance means associated with each of said devices, a plurality of double circuit switches controlled by temperature changes at different points, and connections by which each of said switches is adapted to close a circuit for one of said devices through a predetermined portion of its associated resistance means upon temperature rise and to close a circuit for the other of said devices through a predetermined portion of its associated resistance means upon temperature fall.

7. In an averaging temperature changing system, in combination, a temperature changing means for simultaneously changing the temperature in a plurality of compartments, opposed electrical devices in control of the temperature changing means, resistance means associated with each of said devices, and a double circuit temperature controlled switch controlled by the temperature in each of said compartments for selectively closing a circuit to one or the other of the devices through a predetermined portion of its associated resistance means upon rise and fall in the temperature to which the controller is subjected, whereby the closure of any switch controlled circuit energizes its associated electrical device to a predetermined extent.

8. In an average temperature controlling system, in combination, temperature changing means for changing the temperature in a plurality of compartments, a pair of oppositely acting electrical devices in control of the temperature changing means, current varying means associated with each of said devices, and a temperature controlled switch controlled by the temperature in each compartment for closing a circuit to one of said devices through a predetermined portion of its associated current varying means upon temperature rise and for closing a circuit to the other of said devices through a similar portion of its associated current varying means upon temperature fall, further temperature rise or fall being ineffective to vary the current flow to said device.

9. In an average temperature controlling system, in combination, temperature changing means for changing the temperature in a plurality of compartments, a pair of oppositely acting electrical devices in control of the temperature changing means, resistance means associated with each of said devices, a double circuit device controlled by the temperature in each compartment, connections connecting one circuit of each of said double circuit devices to one of said electrical devices through similar independent portions of its associated resistance means, and connections connecting the other circuit of each of said double circuit devices to the other of said electrical devices through similar independent portions of its associated resistance means.

10. In an averaging temperature control system, in combination, temperature changing means for changing the temperature in a plurality of compartments, reversible motor means in control of the temperature changing means, switching means for controlling the reversible motor means, a pair of opposed electrical devices in control of the switching means, and double circuit switching devices controlled by the temperature in each of said compartments, each such double circuit device being adapted to energize one or the other of said electrical devices a predetermined amount upon a selected rise and fall in temperature, without further energizing the same upon additional temperature rise and fall.

11. In combination, heating means for heating a plurality of compartments, a pair of oppositely acting electrical devices in control of the heating means, a double circuit switching mechanism controlled by the temperature in one of the compartments for energizing one of the devices to a predetermined extent upon a selected temperature rise and for energizing the other device to an equal extent upon a selected temperature fall, without further energizing said devices upon a larger temperature rise or fall, and double circuit switching mechanisms controlled by the temperatures in at least two other compartments for similarly energizing said devices.

12. In combination, heating means for heating a plurality of compartments, a pair of oppositely acting electrical devices in control of the heating means, current varying means associated with said devices, a plurality of double circuit switching mechanisms each controlled by the temperature in one of the compartments, and circuit connections by which each switching mechanism energizes one of said devices to a predetermined extent through the current varying means on a selected temperature rise and energizes the other of the devices through the current varying means to a similar extent upon a selected temperature fall, additional temperature rise and temperature fall being ineffectual to vary the energizations of said devices.

13. The combination with a building divided into a plurality of compartments, of a radiator located in each of the compartments for heating the same, a heating fluid line connected to each radiator, a single valve for controlling the flow of fluid through said line and to all of said radiators, oppositely acting electrical devices in control of the valve, and a plurality of double circuit switching mechanisms each controlled by the temperature of one of the compartments, each switching mechanism being arranged to energize one of the electrical devices to a predetermined extent upon a selected rise in the compartment temperature and to energize the other of the electrical devices to a similar extent upon a selected fall in the compartment temperature, without further energizing either of said devices upon a larger rise or fall in temperature.

14. The combination with a building divided into a plurality of compartments, of a radiator located in each of the compartments for heating the same, a heating fluid line connected to each radiator, a single valve for controlling the flow of fluid through said line and to all of said radiators, oppositely acting electrical devices in control of the valve, a plurality of double circuit switching mechanisms each controlled by the temperature of one of the compartments, and resistance means associating each switching mechanism with said devices whereby closure of either switching mechanism circuit of any switching mechanism energizes one or the other of the electrical devices to a predetermined extent.

15. The combination with a building divided into a plurality of compartments, of a plurality of heating means, one for heating each compartment, a single reversible motor means in control of all of said heating means, a pair of oppositely acting electrical devices in control of the reversible motor means, a plurality of double circuit switching mechanisms, one of said switching mechanisms being controlled by the temperature in each compartment, and connections by which each switching mechanism energizes one of the electrical devices to a predetermined extent upon temperature rise and energizes the other of the electrical devices to a similar extent on temperature fall.

16. The combination with a building having a plurality of compartments, a radiator located in each compartment for heating the same, and a single valve in control of the flow of heating fluid to each of the radiators, of a pair of mechanically connected oppositely acting electrical motors in control of the valve, double circuit switching means for selectively energizing said motors, a pair of oppositely acting electromagnetic coils in control of the switching means, separate resistance means associated with each of the electromagnetic coils, at least three double circuit switching mechanisms controlled by the temperatures in different ones of the compartments, and connections by which each switching mechanism energizes one of the electromagnetic coils through a like portion of its resistance means upon temperature rise and energizes the other of the electromagnetic coils through similar portions of its resistance means upon fall in temperature.

JAMES S. LOCKE.